United States Patent
Fei et al.

(10) Patent No.: US 7,873,336 B2
(45) Date of Patent: Jan. 18, 2011

(54) FREQUENCY OFFSET COMPENSATION FOR COMMUNICATION SYSTEMS

(75) Inventors: Fan Fei, Lawrenceville, GA (US); Ming-Ju Ho, Alpharetta, GA (US); Dukhyun Kim, Marietta, GA (US); Marcel Johannes Gerhardus Vriikorte, Nieuwegein (NL)

(73) Assignee: Agere Systems Inc., Allentown, PA (US)

( * ) Notice: Subject to any disclaimer, the term of this patent is extended or adjusted under 35 U.S.C. 154(b) by 708 days.

(21) Appl. No.: 11/713,178

(22) Filed: Mar. 2, 2007

(65) Prior Publication Data

US 2007/0173203 A1 Jul. 26, 2007

Related U.S. Application Data

(62) Division of application No. 10/263,148, filed on Oct. 2, 2002, now Pat. No. 7,269,394.

(51) Int. Cl.
- H04B 1/00 (2006.01)
- H04B 15/00 (2006.01)
- H04B 17/00 (2006.01)
- H04B 1/18 (2006.01)
- H04B 1/10 (2006.01)

(52) U.S. Cl. .............. 455/130; 455/63.1; 455/67.13; 455/283; 455/296; 375/344

(58) Field of Classification Search ............ 455/63.1, 455/69–71, 67, 11, 67.13, 114.2, 226.1, 226.3, 455/283, 296, 501; 375/319, 344, 346
See application file for complete search history.

(56) References Cited

U.S. PATENT DOCUMENTS

| | | | |
|---|---|---|---|
| 5,245,611 A | 9/1993 | Ling et al. | 370/347 |
| 5,542,095 A | 7/1996 | Petranovich | 455/76 |
| 5,613,193 A * | 3/1997 | Ishikawa et al. | 455/12.1 |
| 5,889,759 A | 3/1999 | McGibney | 370/207 |
| 5,909,640 A | 6/1999 | Farrer et al. | 455/63.1 |
| 5,943,606 A * | 8/1999 | Kremm et al. | 455/12.1 |
| 6,240,276 B1 * | 5/2001 | Camp, Jr. | 455/71 |
| 6,240,556 B1 * | 5/2001 | Evans et al. | 725/114 |
| 6,463,266 B1 | 10/2002 | Shohara | 455/196.1 |
| 6,473,594 B1 | 10/2002 | Piirainen | 455/63.1 |

(Continued)

FOREIGN PATENT DOCUMENTS

EP 1 018 825 A2 7/2000

(Continued)

*Primary Examiner*—Simon D Nguyen
(74) *Attorney, Agent, or Firm*—Mendelsohn, Drucker & Associates, P.C.; Steve Mendelsohn

(57) ABSTRACT

In communications between a pair of stations using modulated carrier signals, a first station estimates the carrier frequency offset with respect to the second station and transmits signals that are responsive to the estimated carrier frequency offset. The first station may adjust the carrier frequency of the signals it transmits in response to the estimated carrier frequency offset, and/or transmit data to the second station representing the estimated carrier frequency offset. The second station adjusts the carrier frequency of the signals it transmits to the first station, and/or compensates for carrier frequency offset in its processing of received signals, in response to estimated carrier frequency offset data received from the first station.

12 Claims, 5 Drawing Sheets

U.S. PATENT DOCUMENTS

| | | | |
|---|---|---|---|
| 6,577,615 B1 | 6/2003 | Ritter et al. | 370/342 |
| 6,584,092 B1 | 6/2003 | Sudo | 370/344 |
| 6,590,945 B1 * | 7/2003 | Brardjanian et al. | 375/340 |
| 6,603,958 B1 | 8/2003 | Gao et al. | 455/63.1 |
| 6,615,024 B1 | 9/2003 | Boros et al. | 455/67.14 |
| 6,757,344 B2 | 6/2004 | Carleton | 375/341 |
| 6,771,718 B1 | 8/2004 | Huttunen | 375/344 |
| 6,847,616 B2 | 1/2005 | Horisaki et al. | 370/252 |
| 6,956,895 B2 * | 10/2005 | Vihriala | 375/148 |
| 7,050,521 B1 | 5/2006 | Alavi | 375/362 |
| 7,167,530 B2 * | 1/2007 | Koomullil et al. | 375/329 |
| 7,535,822 B2 * | 5/2009 | Geile et al. | 370/208 |
| 2001/0047424 A1 | 11/2001 | Alastalo et al. | 709/236 |
| 2002/0045433 A1 | 4/2002 | Vihriala | 455/313 |
| 2002/0159540 A1 * | 10/2002 | Chiodini | 375/316 |
| 2003/0202488 A1 | 10/2003 | Hsuan | 370/331 |
| 2004/0005010 A1 | 1/2004 | He et al. | 375/260 |
| 2004/0081205 A1 * | 4/2004 | Coulson | 370/503 |

FOREIGN PATENT DOCUMENTS

| | | |
|---|---|---|
| EP | 1 235 401 A1 | 8/2002 |
| WO | WO 01/28150 A2 | 4/2001 |
| WO | WO 01/60003 A1 | 8/2001 |

* cited by examiner

FIG. 1
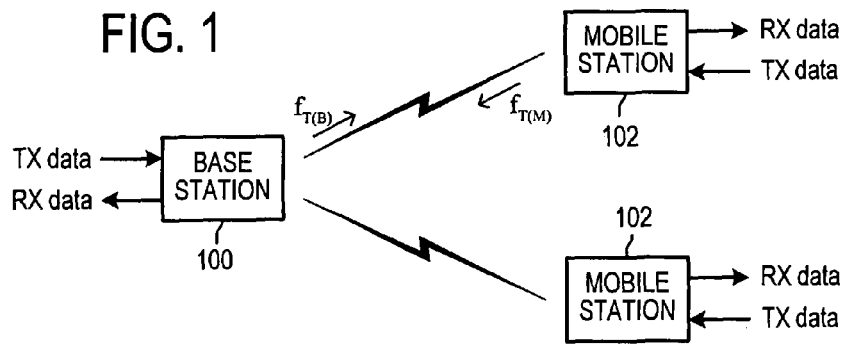
FIG. 2
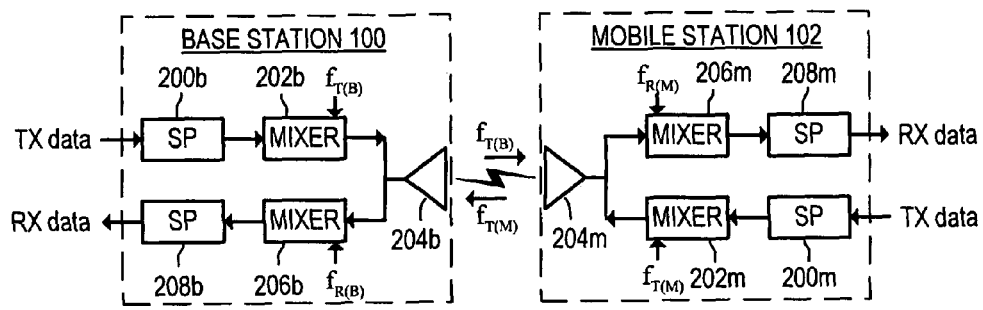
FIG. 3
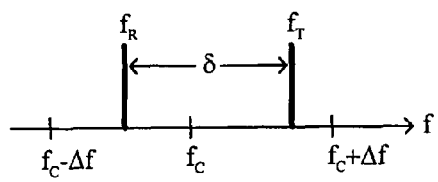
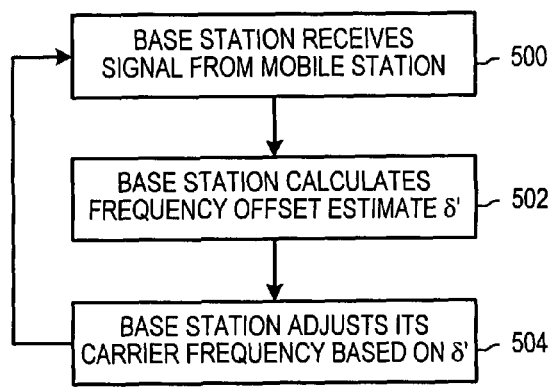
FIG. 5

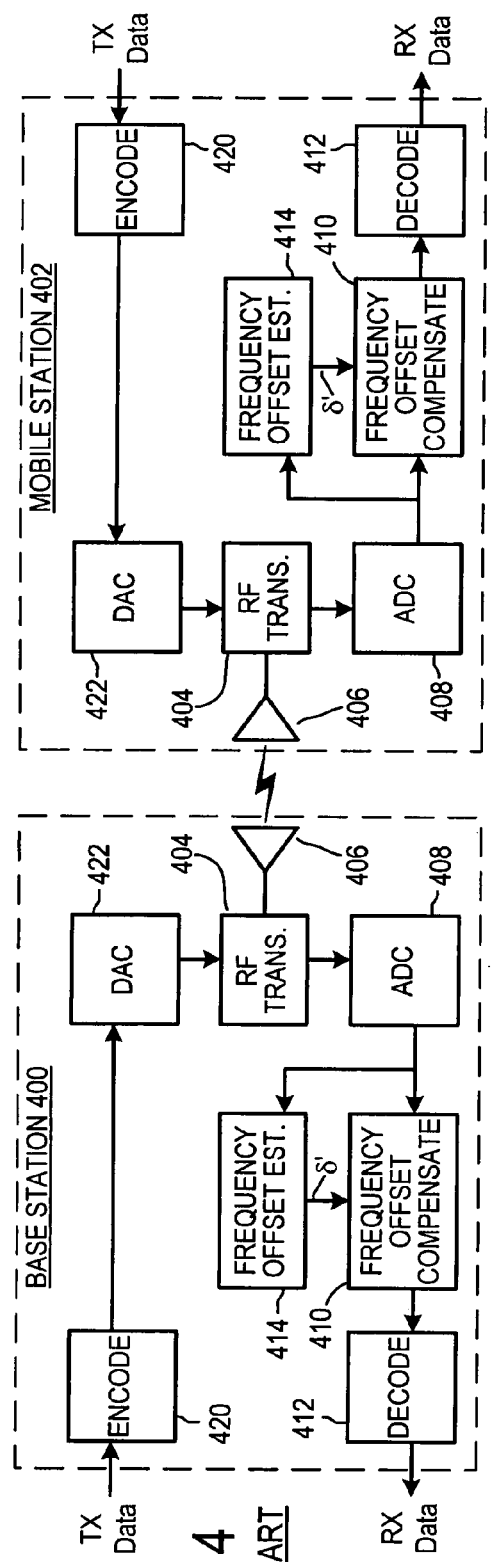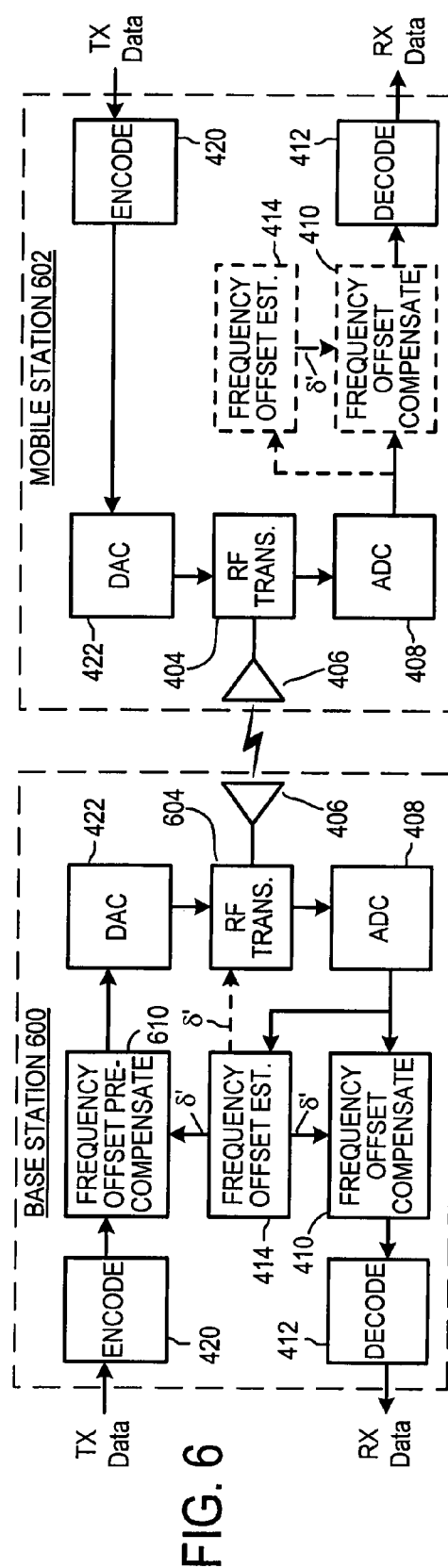

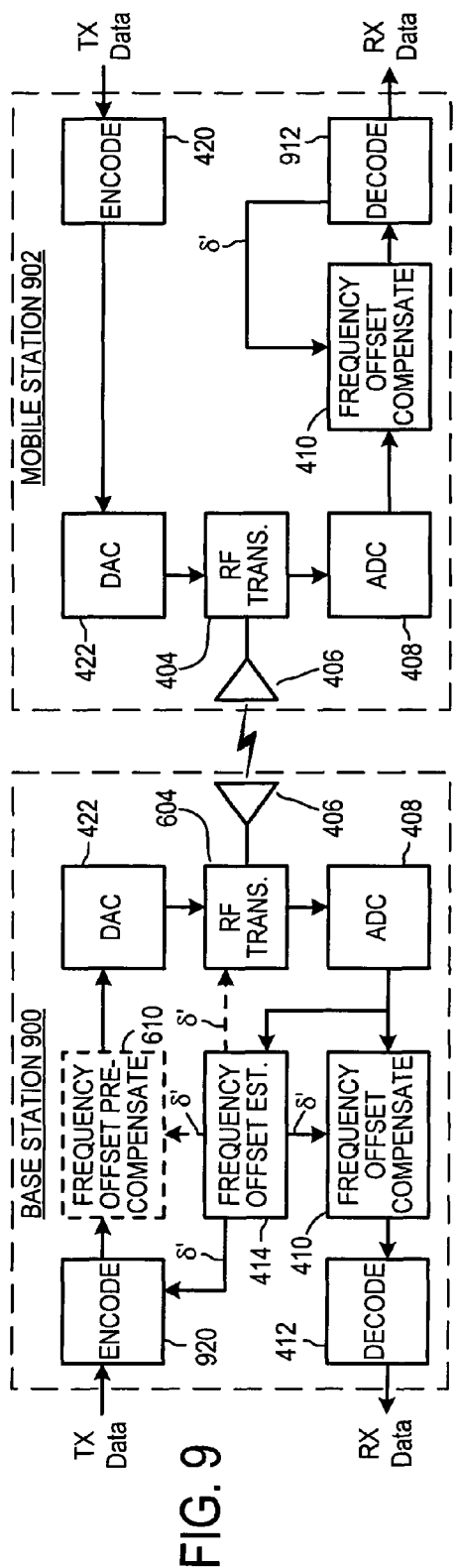
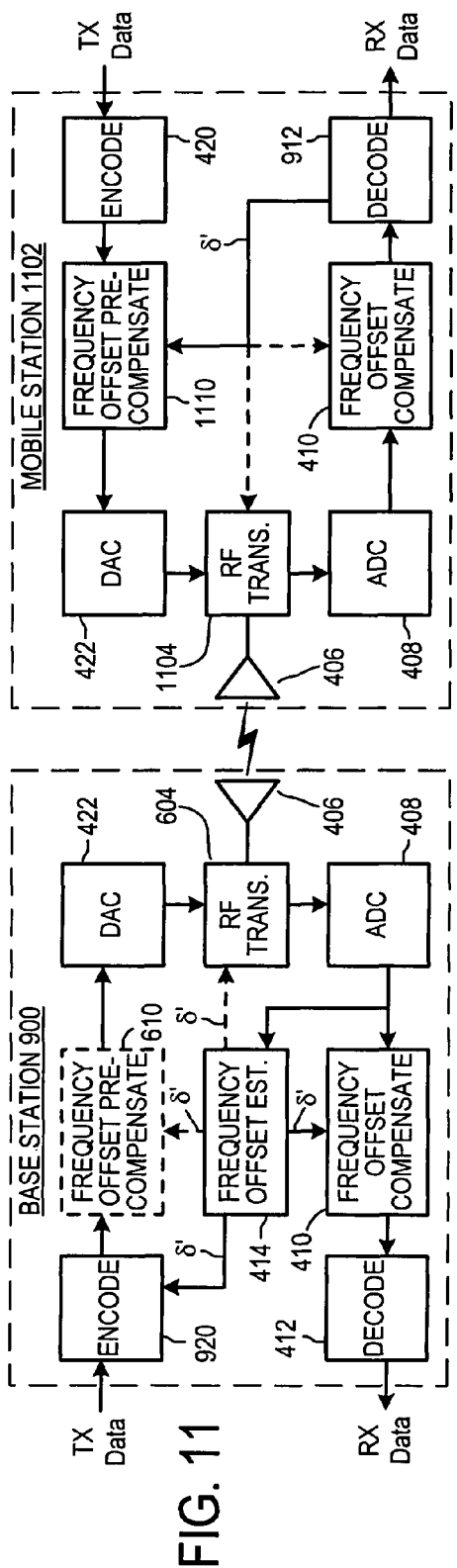
FIG. 9
FIG. 11

FREQUENCY OFFSET COMPENSATION FOR COMMUNICATION SYSTEMS

CROSS-REFERENCE TO RELATED APPLICATIONS

This is a divisional of application Ser. No. 10/263,148, filed on Oct. 2, 2002 now U.S. Pat. No. 7,269,394, the teachings of which are incorporated herein by reference.

BACKGROUND OF THE INVENTION

This invention relates to communication systems in which a pair of stations, each having a transmitter and a receiver, communicate using modulated carrier signals. More particularly, this invention relates to compensation for carrier frequency differences between communicating stations in such a communication system. The present invention may be used, for example, in Orthogonal Frequency Division Multiplexing (OFDM)-based wireless local area network (WLAN) communication systems.

Orthogonal Frequency Division Multiplexing (OFDM) is a special form of multi-carrier modulation. Due to the inherent robustness of OFDM against multipath effects, OFDM is of increasing interest for mobile radio communication systems as FFT (Fast Fourier Transform)-based digital signal processing techniques advance. For example, IEEE 802.11a specifies the Physical Layer Entry for an OFDM system that provides a wireless LAN with data payload communication capabilities from 6 to 54 Mbits/sec in the Unlicensed National Information Infrastructure (U-NII) frequency band. The IEEE 802.11a system uses 52 sub-carriers that are independently modulated using Binary Phase Shift Keying (BPSK), Quadrature Phase Shift Keying (QPSK), 16-Quadrature Amplitude Modulation (16-QAM) or 64-Quadrature Amplitude Modulation (64-QAM) associated with different coding rates for different data speeds.

Due to the multicarrier nature of OFDM-modulated signaling, the performance of an OFDM system may suffer severely from intercarrier interference if the carrier frequency offset between a transmitter in one station and a receiver in another station is sufficiently large. Although single-carrier signaling systems also suffer from such carrier frequency offset, a given amount of carrier frequency offset may degrade system performance to a much greater degree in an OFDM system than in a single-carrier system.

Numerous techniques have been devised to estimate and compensate for carrier frequency offset. Typically, those techniques employ digital signal processing algorithms in the receiver of a station. However, when such frequency estimation techniques are applied under realistic situations, with numerous other impairments including IQ mismatch, DC offsets, nonlinear distortion, local oscillator phase noise, and so on, they may be unable to provide adequate performance, at least without highly complicated implementations.

SUMMARY OF THE INVENTION

The problems in the prior art are addressed in accordance with the principles of the present invention by methods and apparatus in which a first station estimates the carrier frequency offset with respect to a second station and transmits signals that are responsive to the estimated carrier frequency offset. The first station may adjust the carrier frequency of the signals it transmits in response to the estimated carrier frequency offset, and/or transmit data to the second station representing the estimated carrier frequency offset. A second station adjusts the carrier frequency of the signals it transmits to a first station and/or compensates for carrier frequency offset in its processing of received signals in response to received data representing an estimated carrier frequency offset.

In one embodiment, the present invention is a second station having a transmitter adapted to transmit signals to a first station at a second carrier frequency modulated to represent second data signals, and a receiver adapted to receive signals from the first station at a first carrier frequency modulated by first data signals, and to process received signals to generate received data signals corresponding to the first data signals. The receiver is adapted to obtain, from the received data signals, data signals representing a carrier frequency offset estimate and adjust its processing of the received signals based on the data signals representing the carrier frequency offset estimate without independently generating an estimate of the carrier frequency offset between the first station and the second station.

In another embodiment, the present invention is a method for use in a communication system comprising a first station and a second station, the second station being adapted to transmit signals to the first station at a second carrier frequency modulated by second data signals and being adapted to receive signals from the first station at a first carrier frequency modulated by first data signals. The method includes the second station receiving signals modulated by first data signals, processing the received signals to generate received data signals corresponding to the first data signals, obtaining, from the received data signals, data signals representing a carrier frequency offset estimate, and adjusting its processing of the received signals based on the data signals representing the carrier frequency offset estimate without independently generating an estimate of the carrier frequency offset between the first station and the second station.

BRIEF DESCRIPTION OF THE DRAWINGS

The foregoing and other aspects, features, and advantages of the present invention will become more fully apparent from the following detailed description, the appended claims, and the accompanying drawings in which:

FIG. 1 is a block diagram illustrating the elements of a wireless communication system in which the present invention may be employed.

FIG. 2 is a block diagram illustrating circuitry that may be used in the stations of FIG. 1.

FIG. 3 is a graph illustrating carrier frequency offset between a communicating pair of stations.

FIG. 4 is a block diagram illustrating stations using a prior art system of carrier frequency offset compensation.

FIG. 5 is a flow diagram illustrating a method of carrier frequency offset compensation in accordance with an embodiment of the present invention.

FIG. 6 is a block diagram illustrating embodiments of stations in accordance with the present invention.

FIG. 9 is a block diagram illustrating embodiments of stations in accordance with the present invention.

FIG. 11 is a block diagram illustrating embodiments of stations in accordance with the present invention.

DETAILED DESCRIPTION

Figure 7:
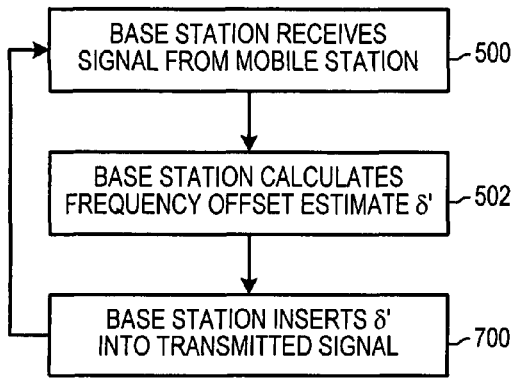
FIG. 7 is a flow diagram illustrating a method of carrier frequency offset compensation in accordance with an embodiment of the present invention.

Although the present invention may be used in other communication systems, it is particularly useful in, and is described with respect to, wireless radio frequency communication systems. Although the present invention may be used in many communication systems in which a first station and a second station communicate with each other using modulated carrier signals, it is particularly useful in communication systems in which communication occurs between one station, which may be referred to as a central station or access point in some systems but is referred to herein as a "base station," and each of a plurality of other stations, such other stations being referred to herein as "mobile stations." FIG. 1 is a block diagram illustrating the elements of a communication system in which the present invention may be employed.

The system of FIG. 1 includes base station 100 and a plurality of mobile stations 102, each of which may communicate with base station 100. In a communicating pair of stations, each station receives data to be transmitted by it ("TX data"), modulates a carrier signal using the TX data, and transmits the modulated carrier signal at a frequency $f_T$, such as by wireless radio frequency transmission. In a communicating pair of stations, each communicating station receives a modulated carrier signal from the other station and demodulates the received signal to produce received data ("RX data") that ideally is identical to the TX data that was used to modulate the transmission. As illustrated, base station 100 transmits signals at frequency $f_{T(B)}$ to upper mobile station 102, and upper mobile station 102 transmits signals at frequency $f_{T(M)}$ to base station 100, the suffixes "B" and "M" referring to the base station and mobile station, respectively.

FIG. 2 is a block diagram illustrating, at a very general level, circuitry that may be used in the stations of FIG. 1, and is included to facilitate understanding of the source of the frequency offset, illustrated in FIG. 3, that the present invention addresses. Elements that appear in several drawing figures are indicated by the same reference numerals in each drawing figure.

In FIG. 2, in a transmit path, each of the stations 100 and 102 receives TX data to be transmitted and processes it at baseband in a signal processor ("SP") 200 to generate a modulating signal. Mixer 202 mixes the modulating signal with a transmit reference signal having frequency $f_T$ to generate a modulated carrier signal having a carrier frequency $f_T$. The modulated carrier signal is coupled to antenna 204 for transmission. In a receive path, modulated carrier signals received by antenna 204 are coupled to mixer 206 and mixed with a receive reference signal having frequency $f_R$ to generate a demodulated signal. The demodulated signal is processed in signal processor 208 to provide RX data.

Ideally, communications from a first station to a second station occur at a nominal or design value $f_C$ of carrier frequency; that is, ideally the first station transmits at $f_T=f_C$, and the second station is tuned to optimally receive and process signals at $f_R=f_C$. However, although the frequency-determining circuitry in each station may be nominally designed to operate at carrier frequency $f_C$, due to practical factors such as component value tolerances and environmental conditions, it may actually operate at a frequency anywhere in a tolerance range, e.g., $f_C \pm \Delta f$. In a communicating pair of stations, the difference between the carrier frequency $f_T$ at which one station transmits signals and the carrier frequency $f_R$ at which another station optimally receives signals is the frequency offset $\delta$ between the stations which the receiver of the receiving station experiences, i.e., $\delta=f_T-f_R$. FIG. 3 is a graph illustrating carrier frequency offset between a communicating pair of stations, such as base station 100 and mobile station 102 illustrated in FIGS. 1 and 2. As indicated above, in general, the performance of a communication system decreases as carrier frequency offset increases.

Prior art methods of compensating for such carrier frequency offset have relied on the receiver in a station to detect frequency offset in signals received by the station and to adjust its processing of the signals received by the station based on the detected frequency offset. FIG. 4 is a block diagram illustrating a communicating pair of stations 400 and 402 using a prior art technique of carrier frequency offset compensation. Both of the stations operate in the same way at the functional level shown, although in a particular implementation the stations may be different, e.g., station 400 may be a base station and station 402 may be a mobile station as shown. The stations are illustrated as using digital signal processing of baseband signals.

In the transmit path, TX data is processed at baseband in encode block 420 to provide a digital modulating signal representing the TX data. The digital modulating signal is converted to an analog signal by digital-to-analog converter ("DAC") 422, and the analog modulating signal is supplied to analog radio frequency transceiver block 404 where it modulates an analog radio frequency carrier signal. The modulated radio frequency carrier signal is supplied to antenna 406, from which signals are radiated and may be received and processed by another station.

In the receive path, RF signals transmitted by another station are received by antenna 406, demodulated by analog RF transceiver block 404 to extract a baseband modulating signal from the RF carrier, and the baseband modulating signal is digitized by analog-to-digital converter ("ADC") 408. Prior to processing in decode block 412 to generate RX data, the digitized modulating signal may be processed in frequency offset compensate block 410 to compensate for carrier frequency offset. The frequency offset compensation processing in block 410 is performed based on the frequency offset estimate $\delta'$ generated by frequency offset estimate block 414 and supplied to block 410.

If the stations use OFDM modulation, encode block 420 may include functions of data encoding, inverse fast Fourier transforming, and guard interval insertion, and decode block 412 may include functions of guard interval deletion, fast Fourier transforming, and data decoding.

Referring again to FIGS. 1-3, each station includes frequency-determining circuitry, not shown, to generate signals $f_T$ and $f_R$. In a typical station both $f_T$ and $f_R$ are derived from a single frequency-reference source, such as a single local oscillator, which thus determines both the carrier frequency at which the station transmits signals and the carrier frequency at which the station is optimized to receive signals. If a base station has a single frequency reference source, and if the communication system is one in which the base station and the mobile stations transmit at the same nominal carrier frequency $f_C$, then $f_{T(B)}=f_{R(B)}$, and the base station carrier frequency, for both transmitted signals and received signals, may be referred to simply as $f_B$. If a mobile station has a single frequency-reference source, and if the communication system is one in which the base station and the mobile stations transmit at the same nominal carrier frequency $f_C$, then $f_{T(M)}=f_{R(M)}$, and the mobile station carrier frequency, for both transmitted signals and received signals, may be referred to simply as $f_M$. Thus $\delta_B=f_M-f_B$, $\delta_M=f_B-f_M$, and $\delta_B=-\delta_M$. The significance of this result is that one station can determine the carrier frequency at which the other station is optimized to receive signals by determining the carrier frequency at which the other station transmits signals.

In embodiments of the present invention, a first station generates a carrier frequency offset estimate and, in addition to or instead of compensating its processing of received signals based on the estimate, supplies the estimate to circuitry in its transmit path and transmits signals that are responsive to the carrier frequency offset estimate. Although in principle the stations of a communication system may be identical, in practice in systems having a base station and a plurality of mobile stations there usually are differences. A base station is typically less constrained than a mobile station is by performance-limiting design considerations such as size, cost, and power consumption, and a base station may usually be designed with better-quality components, more-complicated signal processing, and greater power consumption, resulting in better frequency-offset estimation and compensation capability than is provided in the mobile stations. Thus, it is expected that in implementations of the present invention in systems having a base station and a plurality of mobile stations, it will be the base station that estimates the carrier frequency offset between the base station and a particular mobile station, and transmits signals that are responsive to the carrier frequency offset estimate. Accordingly, FIGS. 5-15 and the descriptions thereof may indicate that particular features are associated with a base station or mobile station, but it should be understood that the present invention is not so limited.

FIG. 5 is a flow diagram illustrating a method of carrier frequency offset compensation in accordance with an embodiment of the present invention. In step 500, a base station receives a signal from a mobile station. In step 502, the base station calculates, based on the received signal, an estimate $\delta'$ of the carrier frequency offset between the mobile station and the base station. In step 504, the base station adjusts the carrier frequency of its transmitted signals based on its carrier frequency offset estimate $\delta'$ in order to compensate, at least partially, for the estimated frequency offset. For instance, the base station may adjust its carrier frequency by $\delta'$ to fully compensate for the estimated carrier frequency offset. The process then returns to step 500 and is repeated upon receipt of another signal.

In the method of FIG. 5, a first station adjusts the carrier frequency at which it transmits signals to a second station so as to reduce carrier frequency offset occurring at the second station. This compensation process may be referred to as "pre-compensation" since it occurs before transmission of a signal to a receiving station, as distinguished from the prior art compensation of signals after they are received in a receiving station. Pre-compensation effects carrier frequency offset compensation by reducing the offset itself, rather than by reducing the effects of carrier frequency offset.

FIG. 6 is a block diagram illustrating embodiments of communicating stations in accordance with the present invention. Base station 600 implements the method shown in FIG. 5. The receive path in base station 600 is the same as that in base station 400 shown in FIG. 4. The transmit path in base station 600 adjusts the carrier frequency of the station's transmitted signals based upon the carrier frequency offset estimate $\delta'$ generated in the receive path. The transmit path includes frequency offset pre-compensation block 610 which, as indicated by the solid arrow, receives carrier frequency offset estimate $\delta'$ from frequency offset estimate block 414 and, in response, alters the modulated baseband signal supplied to DAC 422 in order to effect an adjustment of the carrier frequency of the signals transmitted by base station 600. For instance, pre-compensation block 610 may rotate the phases of the signals generated by encode block 420; such phase rotation of the baseband signals effects, when supplied to analog RF transceiver block 604, an adjustment of the carrier frequency of the modulated signals generated by analog RF transceiver block 604 and coupled to antenna 406. Alternatively, pre-compensation block 610 may be provided as part of analog RF transceiver block 604, and may receive $\delta'$ from frequency offset estimate block 414 as shown by the dashed arrow. For instance, analog RF transceiver block 604 may include an adjustable multiplier such as a voltage-controlled oscillator in its frequency-determining circuitry, and $\delta'$ may effect adjustment of the multiplier such as by adjustment of the control voltage of such a voltage-controlled oscillator.

Because of the pre-compensation effected by base station 600, the signal processing required in mobile station 602 to achieve a given performance level may reduced. As indicated by the dashed lines, frequency offset estimate block 414 and frequency offset compensate block 410 might be eliminated in mobile station 602, or might be provided in simpler form with reduced performance compared to prior art systems, while providing system performance comparable to prior art systems. A communication system including a base station 600 and a prior art mobile station 402 may provide improved system performance.

FIG. 7 is a flow diagram illustrating a method of carrier frequency offset compensation in accordance with an embodiment of the present invention. As described above with respect to FIG. 5, in step 500, a base station receives a signal from a mobile station, and in step 502, the base station calculates, based on the received signal, an estimate $\delta'$ of the carrier frequency offset between the mobile station and the base station. In step 700, the base station inserts carrier frequency offset estimate $\delta'$ into its transmitted signal. This enables a mobile station receiving the transmitted signal to use $\delta'$ to compensate for the estimated frequency offset.

Figure 8:
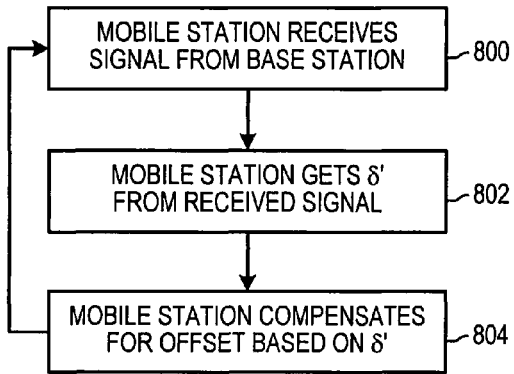
FIG. 8 is a flow diagram illustrating a method of carrier frequency offset compensation in accordance with an embodiment of the present invention.

FIG. 8 is a flow diagram illustrating a method of carrier frequency offset compensation in accordance with an embodiment of the present invention. In step 800, a mobile station receives a signal from a base station operating as described above with respect to FIG. 7. In step 802, the mobile station obtains carrier frequency offset estimate $\delta'$ from the data content of the received signal. In step 804, the mobile station adjusts its processing of received signals based on the carrier frequency offset estimate $\delta'$ obtained in step 802.

FIG. 9 is a block diagram illustrating embodiments of stations in accordance with the present invention. Base station 900 implements the method shown in FIG. 7, and mobile station 902 implements the method shown in FIG. 8. In base station 900, carrier frequency offset estimate $\delta'$ is supplied to encode block 920 and is encoded, along with the TX data, in the modulating signal generated by encode block 920.

Decode block 912 in mobile station 902 obtains δ' from the data it generates from received signals and supplies δ' to frequency offset compensate block 410, which adjusts its processing of received signals in order to compensate for carrier frequency offset. Because the value of δ' is obtained as data from the received signals, frequency offset estimate block 414 shown in FIG. 4 is not needed and may be omitted.

Figure 10:
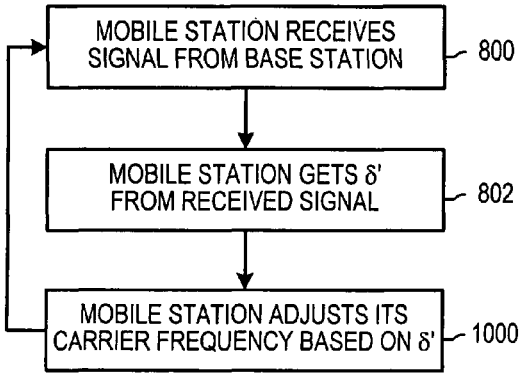
FIG. 10 is a flow diagram illustrating a method of carrier frequency offset compensation in accordance with an embodiment of the present invention.

FIG. 10 is a flow diagram illustrating a method of carrier frequency offset compensation in accordance with an embodiment of the present invention. In step 800, a mobile station receives a signal from a base station operating as described above with respect to FIG. 7. In step 802, the mobile station obtains carrier frequency offset estimate δ' from the data content of the received signal. In step 1000, the mobile station adjusts the carrier frequency of its transmitted signals based on the carrier frequency offset estimate δ' obtained in step 802.

FIG. 11 is a block diagram illustrating embodiments of stations in accordance with the present invention. Base station 900 implements the method shown in FIG. 7 and is described above with respect to FIG. 9, and mobile station 1102 implements the method shown in FIG. 10. Decode block 912 in mobile station 1102 obtains δ' from the data it generates from received signals and supplies δ' to pre-compensation block 1110 which, in response, alters the modulated baseband signal supplied to DAC 422 in order to effect an adjustment of the carrier frequency of the signals transmitted by mobile station 1102. For instance, as described above with respect to FIG. 6, pre-compensation block 1110 may rotate the phases of the signals generated by encode block 420, and alternatively, pre-compensation block 1110 may be provided as part of analog RF transceiver block 1104, and may receive δ' from decode block 912 as shown by the dashed arrow.

Figure 12:
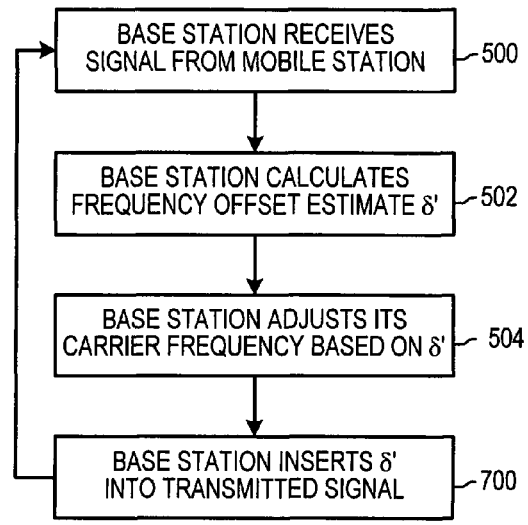
FIG. 12 is a flow diagram illustrating a method of carrier frequency offset compensation in accordance with an embodiment of the present invention.
Figure 13:
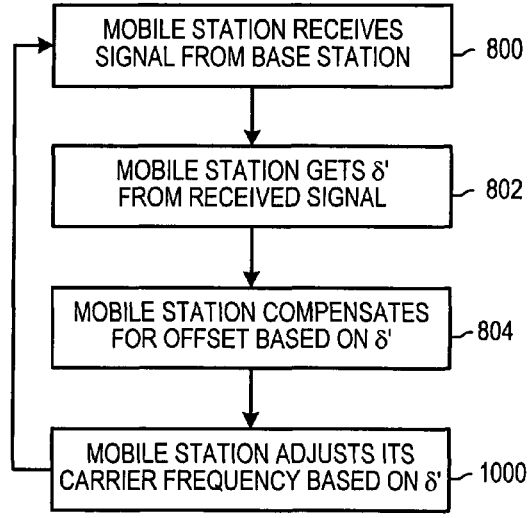
FIG. 13 is a flow diagram illustrating a method of carrier frequency offset compensation in accordance with an embodiment of the present invention.

FIGS. 12 and 13 are flow diagrams illustrating methods of carrier frequency offset compensation in accordance with embodiments of the present invention. The method of FIG. 12 combines the methods of FIGS. 5 and 7; that is, the base station both adjusts the carrier frequency of its transmitted signals based on its carrier frequency offset estimate δ' in step 504 and inserts carrier frequency offset estimate δ' into its transmitted signal in step 700. Base station 900 is shown as capable of performing both functions. The method of FIG. 13 combines the methods of FIGS. 8 and 10; that is, the mobile station both adjusts its processing of received signals in step 804 and adjusts the carrier frequency of its transmitted signals based on its carrier frequency offset estimate δ' in step 1000. Mobile station 1102 is shown as capable of performing both functions.

Figure 14:
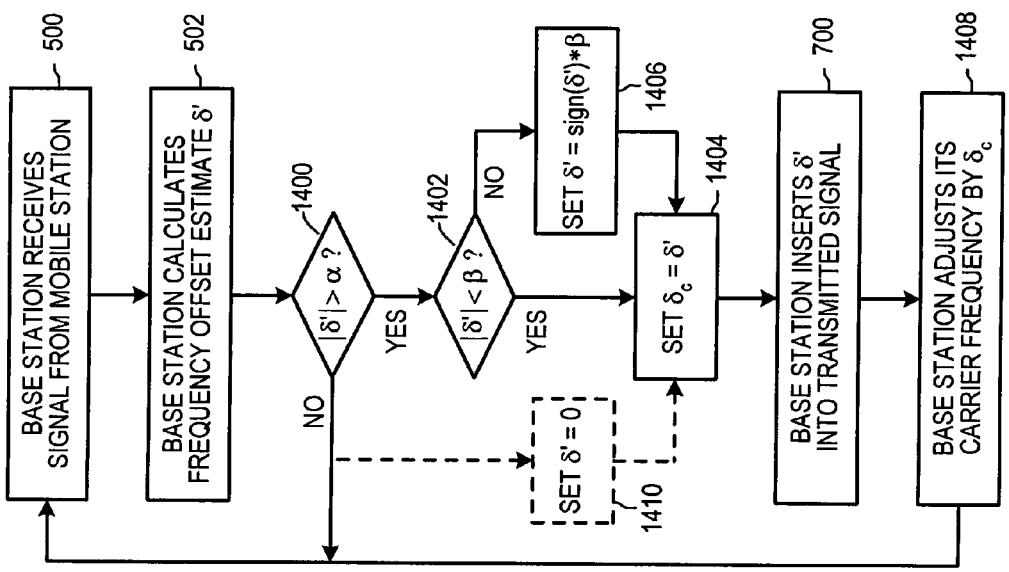
FIG. 14 is a flow diagram illustrating a method of carrier frequency offset compensation in accordance with an embodiment of the present invention.

FIG. 14 is a flow diagram illustrating a method of carrier frequency offset compensation in accordance with an embodiment of the present invention. In step 500 a base station receives a signal from a mobile station, and in step 502 the base station calculates a carrier frequency offset estimate δ' between the two stations. In step 1400 the magnitude of the carrier frequency offset estimate δ' is compared to α, a threshold value representing a minimum value of δ' at which pre-compensation is to be performed. The value of α may be set to zero, in which case pre-compensation is performed in the base station unless the carrier frequencies are identical.

If the magnitude of the carrier frequency offset estimate δ' is less than α, then no compensation is performed, and the base station returns to step 500 and waits for another signal to be received. Thus, if the carrier frequencies of communicating stations are close enough that the stations can adequately communicate without adjusting the base station carrier frequency, then such base station pre-compensation is omitted. If the magnitude of the frequency offset estimate δ' is greater than α, then the process continues in step 1402 which, together with steps 1404 and 1406, limits the amount of carrier frequency offset pre-compensation. Limitation of carrier frequency offset pre-compensation may be undertaken, for instance, for the following reasons.

Under certain circumstances, for instance, to comply with technical standards or regulatory requirements, it may be desirable to limit the amount of frequency compensation that is performed. For example, IEEE 802.11a requires frequency accuracy within a tolerance of 20 parts per million. For a nominal carrier frequency $f_C$ of 6 GHz, for example, this means an allowable tolerance band of ±120 kHz, and either station's frequency deviation from the nominal carrier frequency can be as high as 120 kHz. Therefore, the magnitude of the carrier frequency offset δ may be as high as 240 kHz. If the base station has very good frequency accuracy, its pre-compensation may be limited, for example, to 120 kHz, to prevent its transmissions from violating the standard. Limiting pre-compensation in this manner may result in incomplete pre-compensation, i.e., there may be carrier frequency offset remaining after the maximum allowed pre-compensation. For example, the base station carrier frequency might be 60 kHz below the nominal value, and the mobile station carrier frequency might be 120 kHz above the nominal value. Limiting the amount of the base station's carrier frequency pre-compensation to 120 kHz would result in a pre-compensated base station carrier frequency of 60 kHz above the nominal, and a frequency offset of 60 kHz remaining after maximum pre-compensation. This residual offset of 60 kHz is typically less problematic than the 180-kHz carrier frequency offset that would occur without pre-compensation.

Limiting the amount of frequency pre-compensation is performed in steps 1402, 1404, and 1406. In step 1402 the magnitude of the carrier frequency offset estimate δ' is compared to β, a threshold establishing the maximum amount of frequency pre-compensation that may be applied. If the magnitude of δ' is less than β, then the method proceeds to step 1404, and pre-compensation amount $δ_C$ is set to the frequency offset estimate calculated in step 1402. If the magnitude of the frequency offset estimate δ' is greater than β, then the method proceeds to step 1406, in which δ' is set to a value having the sign of the frequency offset estimate calculated in step 502 and having the magnitude of the maximum pre-compensation amount β. The method then proceeds to step 1404, in which the value of $δ_C$ is set to δ', and to step 700, in which the base station inserts δ' into its transmitted signal, and to step 1408, in which the base station adjusts its carrier frequency by the pre-compensation amount $δ_C$.

In some embodiments, a base station may operate using an algorithm that repetitively looks for a value of δ' to insert into the transmitted signal in step 700 and/or a value of $δ_C$ by which its carrier frequency is to be adjusted in step 1408. In such embodiments, when in step 700 it is determined that the magnitude of δ' does not exceed α, rather than returning to step 500, the alternate path shown by dashed lines may be provided. In that path, in step 1410 the value of δ' is set to zero, and the process continues in step 1404 as previously described.

Figure 15:
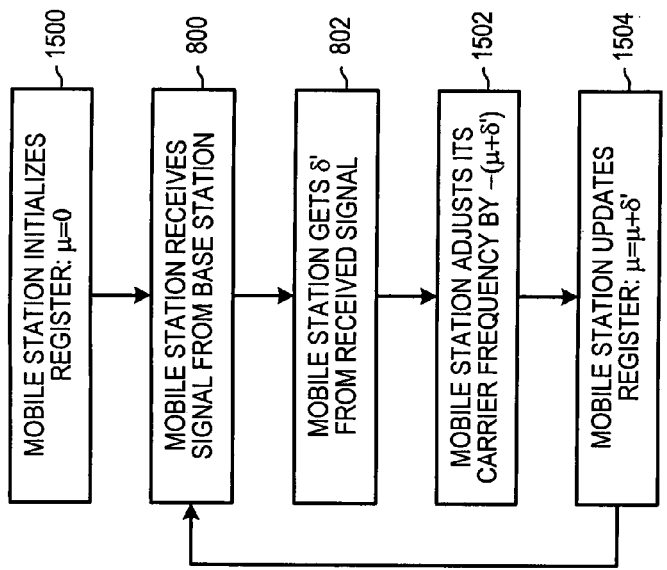
FIG. 15 is a flow diagram illustrating a method of carrier frequency offset compensation in accordance with an embodiment of the present invention.

FIG. 15 is a flow diagram illustrating a method of carrier frequency offset compensation in accordance with an embodiment of the present invention. FIG. 15 illustrates a more specific method of mobile station operation than that of FIG. 8. In step 1500, a register holding a value μ is initialized to μ=0. In step 800, the mobile station receives a signal from a base station operating as described above with respect to FIG. 7. In step 802, the mobile station obtains carrier frequency offset estimate δ' from the data content of the received signal. In step 1502, the mobile station adjusts the carrier frequency of its transmitted signals by the quantity $-(\mu+\delta')$. In step 1504 the mobile station updates the register by setting $\mu=\mu+\delta'$, and then the process returns to step 800 and is repeated with the next value of $\delta'$ obtained from a subsequent received signal.

In embodiments of the invention where mobile stations adjust their carrier frequencies to that of a base station, an entire communication system may become frequency-synchronized. When the base station receives a signal from a mobile station, the base station estimates the carrier frequency offset of the signal and communicates the estimate to the mobile station, and the mobile station then adjusts its carrier frequency for its next transmission. By successive iterations of the process, the carrier frequency of the mobile station approaches that of the base station. The process may be performed, for instance, until the carrier frequency offset is reduced below the threshold $\alpha$. Each mobile station in the system may perform this process, in which case all mobile stations will tend to synchronize themselves to the carrier frequency of the base station.

Although the invention has been described with respect to communication systems in which a base station and mobile stations transmit at the same nominal carrier frequency, the invention is not so limited. The invention is applicable to systems in which the stations each use a single frequency reference source both to generate carrier signals and to process received signals. In such systems, deviation of the frequency reference source from nominal its nominal value will affect both the carrier frequency of a station's transmitted signals and the carrier frequency at which the station is optimized to receive and process signals, and a measured carrier frequency offset can be scaled to reflect a nominal transmit carrier frequency difference between stations.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The terms "base station" and "mobile station" may apply to stations of a communication system that are generally fixed and generally moveable, respectively, as may be the case in a wireless LAN, for example. However, it should be understood that as these terms are used herein, a station is a "base station" if the station communicates with each of a plurality of other stations that communicate solely with the station, and a station is a "mobile station" if the station is one of a plurality of stations, each of which communicates solely with a common station.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A second station comprising:
   a transmitter adapted to transmit signals to a first station at a second carrier frequency modulated to represent second data signals; and
   a receiver adapted to receive signals from the first station at a first carrier frequency modulated by first data signals, and to process received signals to generate received data signals corresponding to the first data signals, wherein the receiver is adapted to:
   apply, by a frequency offset compensate block of the receiver, frequency offset compensation processing to the received signals to generate compensated received signals;
   decode, by a decode block of the receiver, the compensated received signals to generate the received data signals;
   obtain, from the received data signals, data signals representing a carrier frequency offset estimate; and
   adjust its frequency offset compensation processing of the received signals based on the data signals representing the carrier frequency offset estimate without independently generating an estimate of the carrier frequency offset between the first station and the second station.

2. The invention of claim 1, wherein the transmitter is adapted to adjust the second carrier frequency in response to the data signals representing the carrier frequency offset estimate.

3. The invention of claim 2, wherein the carrier frequency adjustment includes rotating phases of the first data signals.

4. The invention of claim 1, wherein the second station is a mobile station adapted to communicate with a base station and to transmit wireless radio frequency carrier signals modulated by orthogonal frequency division multiplexing.

5. The invention of claim 1, wherein the first carrier frequency is substantially equal to the second carrier frequency.

6. The invention of claim 1, wherein the receiver does not have a frequency offset estimator.

7. In a communication system comprising a first station and a second station, the second station being adapted to transmit signals to the first station at a second carrier frequency modulated by second data signals and being adapted to receive signals from the first station at a first carrier frequency modulated by first data signals, a method comprising, at the second station, the steps of:
   (a) receiving signals modulated by first data signals;
   (b) applying, by a frequency offset compensate block of a receiver of the second station, frequency offset compensation processing to the received signals to generate compensated received signals;
   (c) decoding, by a decode block of the receiver of the second station, the compensated received signals to generate received data signals corresponding to the first data signals;
   (d) obtaining, from the received data signals, data signals representing a carrier frequency offset estimate; and
   (e) adjusting the frequency offset compensation processing of the received signals based on the data signals representing the carrier frequency offset estimate without independently generating an estimate of the carrier frequency offset between the first station and the second station.

8. The invention of claim 7, further comprising adjusting the second carrier frequency based on the data signals representing the estimated carrier frequency offset.

9. The invention of claim 7, wherein the second station is a mobile station adapted to communicate with a base station and to transmit wireless radio frequency carrier signals modulated by orthogonal frequency division multiplexing.

10. The invention of claim 7, wherein the first carrier frequency is substantially equal to the second carrier frequency.

11. The invention of claim 7, wherein the receiver does not have a frequency offset estimator.

12. A second station for a communication system comprising a first station and the second station, the second station being adapted to transmit signals to the first station at a second carrier frequency modulated by second data signals and being adapted to receive signals from the first station at a first carrier frequency modulated by first data signals, the second station comprising:

(a) means for receiving signals modulated by first data signals;

(b) means for applying frequency offset compensation processing to the received signals to generate compensated received signals;

(c) means for decoding the compensated received signals to generate received data signals corresponding to the first data signals;

(d) means for obtaining, from the received data signals, data signals representing a carrier frequency offset estimate; and (e) means for adjusting the frequency offset compensation processing of the received signals based on the data signals representing the carrier frequency offset estimate without independently generating an estimate of the carrier frequency offset between the first station and the second station.

* * * * *